UNITED STATES PATENT OFFICE.

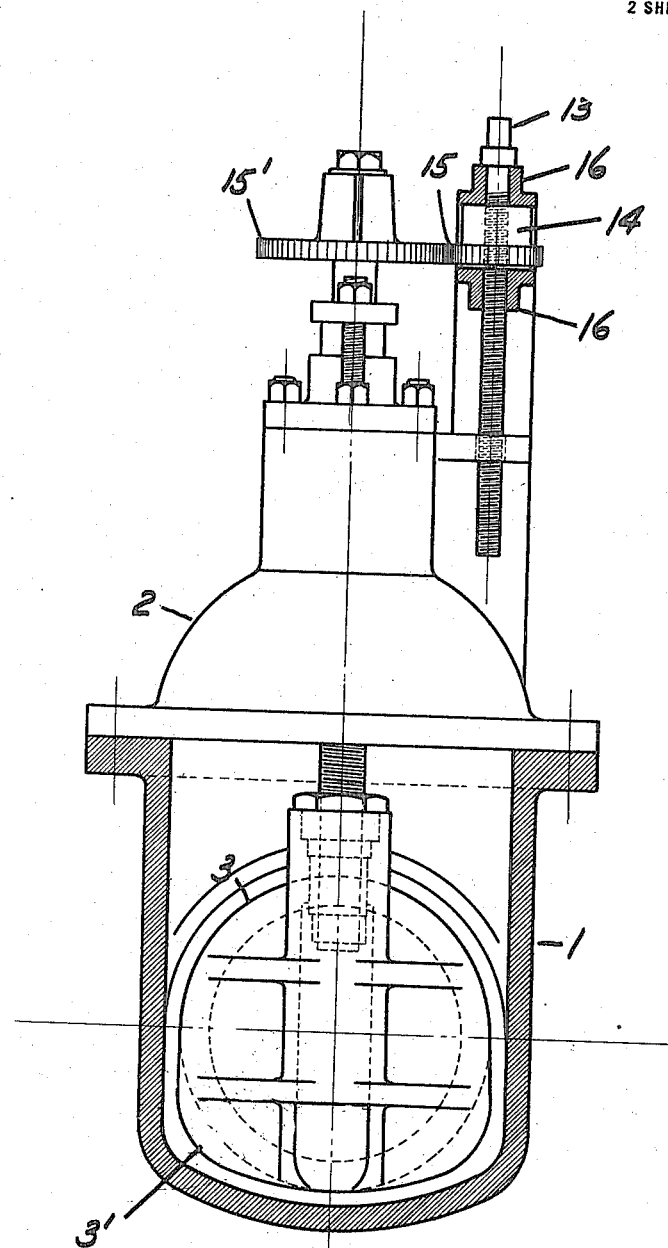

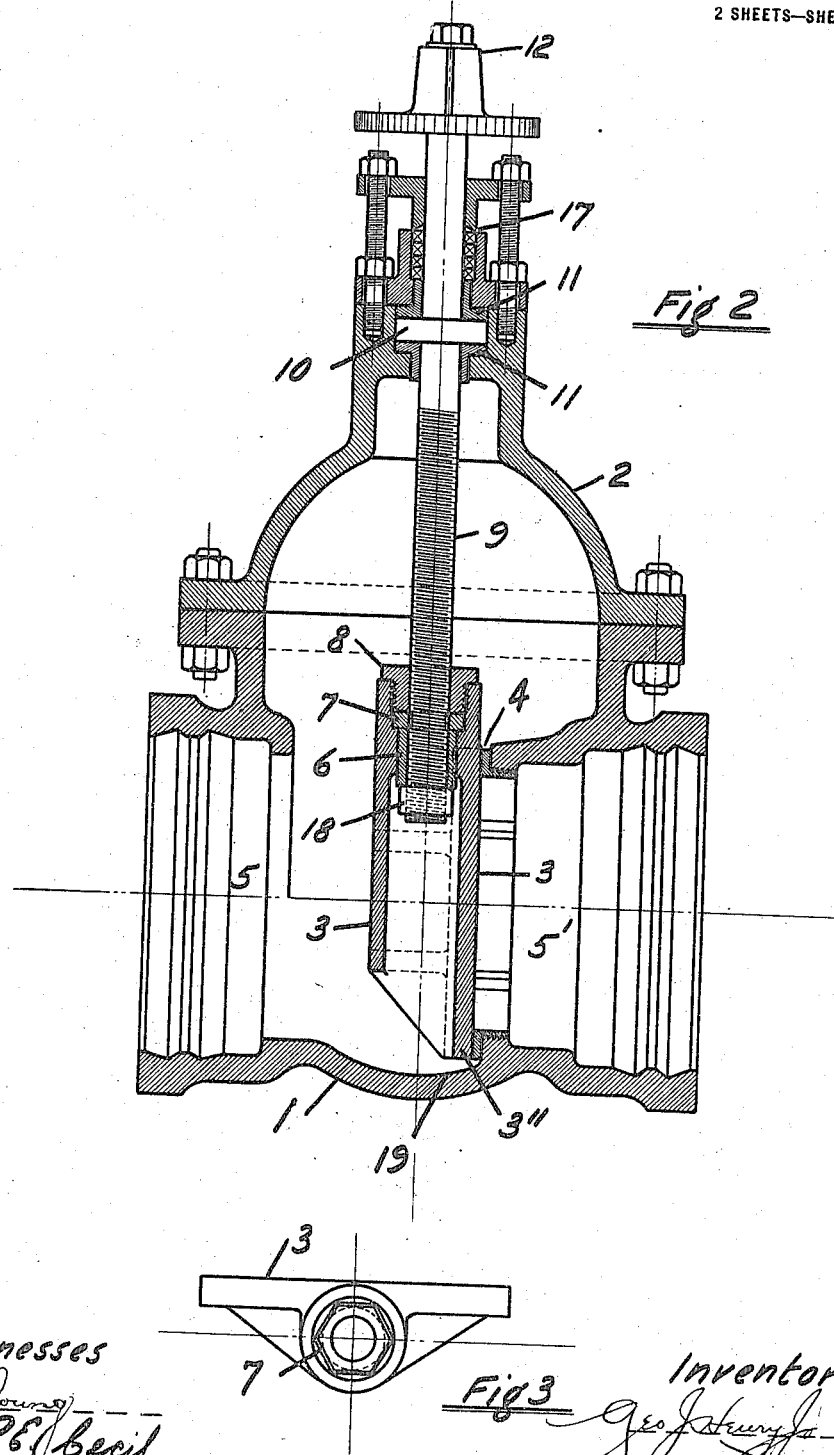

GEORGE J. HENRY, JR., OF SAN FRANCISCO, CALIFORNIA.

VALVE MECHANISM FOR GATE-VALVES.

1,221,052.

Specification of Letters Patent.   Patented Apr. 3, 1917.

Application filed October 5, 1912.   Serial No. 724,144.

*To all whom it may concern:*

Be it known that I, GEORGE J. HENRY, Jr., a citizen of the United States, residing in the city and county of San Francisco and State of California, have invented certain new and useful Improvements in Valve Mechanism for Gate-Valves, of which the following is a specification.

The invention relates to that class of valves used for stopping, regulating or interrupting the flow of water or fluid in a conduit or pipe and is for the purpose of overcoming the difficulties met with heretofore in valves for similar purposes. The difficulties heretofore experienced have been occasioned by the seating of the valve disk against wedge surfaces causing an initial pressure against the gate disk increasing the friction on the seat and thus increasing the effort to close or open the valve and throwing excessive strains on the gate stem, making necessary an outside screw with packing gland and supporting yoke. This latter is also made necessary by the difficulty heretofore experienced in fitting a nut into the gate disk such as to prevent its coming loose and making the gate inoperative; also unequal shrinkage of body against disk, causing the body to break and also the tilting of the gate disk during periods of partial closure so that the gate seat was injured and further the assembly of the parts so as to prevent the injury of the valve body by the stem forcing the disk down against the valve body. Also it has been customary heretofore to force the disk against the seat by some form of wedge or toggle to prevent the water or fluid entering the body of the gate and thus putting great strains on the guides or runway in the body of the gate, making it necessary to make these of large dimensions and greatly increasing the friction thereon.

Further, it was necessary to have exact alinement of the disk and seat, otherwise considerable leakage would occur.

These are overcome in the gates of my invention. In the gate valve of my invention, made the subject of an earlier patent, a double disk form of construction was made use of together with associated means for operating same. The valve which forms the subject matter of this invention is however of simplified form.

It will be seen that on the gate being closed, pressure of the fluid is used to hold the disk on its seat to prevent leakage and therefore no greater pressure is exerted on the disk than that due to the water or fluid, whereas, with other types, a pressure at all times of operation or closure greater than the maximum which will be exerted by the fluid or water.

The form of gate herein described will therefore hold against any pressure, and may be unseated and operated with a minimum of effort.

The accompanying drawings illustrate my type of valve.

Figure 1 is an end view of the valve showing the position of the valve disk when closed.

Fig. 2 is a side cross section view of the valve.

Fig. 3 is a plan view of some of the parts assembled in their proper relation.

The numerals on each of the figures refer to the same parts.

1 is the valve body, 2 is the cover forming with the body 1 a working chamber for the disk 3 which is guided on the seat 4 over which it may freely move to open or close the passage way for fluid 5 5'.

To the valve 3 is secured against rotation, the valve nut 6 in the hexagon shaped socket 7' receiving the hexagon head 7 of valve nut 6, and held in place by the lock nut or collar 8. The rotation of the threaded stem 9 held in place by the collar 10 and wearing plates 11 raises or lowers the valve plate 3 controlling the passageway 5 5'. As the valve plate 3 is raised, the projecting surface 3' enables a large area of contact with the valve seat 4 to secure the least wearing or cutting of the seat. The valve stem 9 is extended beyond the pressure chamber and may be operated by a suitable nut 12 or in large sizes through gears, preferably of the "stub" or short tooth kind. The gate is preferably supplied with an indicator to show the position of the valve plate 3 with respect to the seat 4 and the passageway 5 5'. In the form shown, this indicator consists of a rod 13 which is raised or lowered by the nut 14 through the gear teeth 15, 15' from the nut 12. The indicator nut is supported on the bracket 16. The stem passes through a suitable packing gland 17 and has mounted on its lower extremity a collar or nut 18 for preventing the valve plate at 3'' from advancing against the body at 19 which would set up additional internal strains in the main body stem and valve plate and unseat the valve plate 3 from the seat 4.

I claim:—

1. In a valve for fluid pressures, a valve seat in combination with a valve plate having a convex lower edge of larger radius than the remaining portion of the valve plate, forming thereby extended surface portions for engaging slidably over the valve seat, a stem provided with a screw thread, said screw thread engaging with a nut secured against rotation to the said valve plate and means mounted on the valve stem to prevent the valve plate being forced beyond a predetermined position.

2. In a valve for fluid pressures, a valve seat in combination with a valve plate having a convex lower edge of larger radius than the remaining portion of the valve plate, forming thereby extended surface portions for engaging slidably over the valve seat, a stem provided with a screw thread, said screw thread engaging with a nut secured against rotation to the said valve plate and means mounted on the valve stem to prevent the valve plate being forced beyond a predetermined position, and a valve body casing formed with pockets for receiving the ends of the convex lower portion of the valve plate.

3. A valve seat of circular form in combination with a valve plate, said plate of distorted circular form so as to provide a greater proportional bearing area during its movement across the face of said seat, a body casing formed for receiving the plate with pockets for those portions of the plate distorted from circular form, means for moving said plate across the face of said seat, means for arresting the movement of said plate before contact of the plate with the body, said means consisting of a stop on the valve moving member.

4. In a valve for fluid pressures, a valve disk movable on a valve seat, a stem mounted to shift said valve disk by means of a screw thread acting within a valve nut, said valve nut held against rotation in a socket formed in said valve disk and a lock nut for securing said valve nut in said socket.

5. In a valve for fluid pressures, a valve disk movable on a valve seat, a stem mounted to shift said valve disk by means of a screw thread acting within a valve nut, said valve nut held against rotation in a socket formed in said valve disk and a lock nut for securing said valve nut in said socket and forming with said valve disk means of adjusting said valve nut.

6. In a valve for fluid pressures, a valve disk movable on a valve seat, a valve stem mounted to shift said valve disk parallel with said valve seat by means of a screw thread acting within a valve nut, said valve nut held against rotation in a socket formed in said valve disk and a lock nut for securing said valve nut in said socket.

7. In a valve for fluid pressures, a valve disk movable on a valve seat, a valve stem mounted to shift said valve disk parallel with said valve seat by means of a screw thread acting within a valve nut, said valve nut held against rotation in a socket formed in said valve disk and a lock nut for securing said valve nut in said socket, said lock nut forming an adjustable seat for said valve nut.

8. In valve mechanism for gate valves, a valve disk movable on a valve seat, a stem mounted to shift said valve disk by means of a screw thread acting on a valve nut, said valve nut held against rotation in a socket formed in said valve disk, by an adjustable lock nut, said stem free to rotate, but held against endwise movement by a collar mounted thereon and having wearing plates secured by a gland substantially as shown.

9. In a valve for fluid pressures, a valve plate movable on a valve seat, a screw threaded stem, said screw thread engaging with a nut, said nut mounted with said valve plate and held against rotation therewith, a member loosely surrounding said stem and securing said nut in position by screw threaded engagement between said valve plate and said member.

10. In a valve for fluid pressures a screw threaded stem, a valve plate movable on a valve seat parallel with the axis of said stem, a nut mounted with said valve plate and held against rotation therewith in screw-thread engagement with the stem, a member loosely surrounding said stem and securing said nut in position by locked engagement between said valve plate and said member, a valve body carrying said valve seat, said body being apertured to pass said member and said nut, a plate to cover said aperture and means to lock said stem against endwise movement.

11. In a valve for fluid pressures, a screw threaded stem, a valve plate movable on a valve seat parallel with the axis of said stem, a nut mounted with said valve plate and held against rotation therewith in screwthread engagement with the stem, a member loosely surrounding said stem and securing said nut in position by locked engagement between said valve plate and said member, a valve body carrying said valve seat, said body being apertured to pass said member and said nut, a plate to cover said aperture and means to lock said stem against endwise movement, said aperture of form suited to pass said valve plate and said valve seat.

12. In a gate valve a body forming when the valve is opened, a passageway substantially angular in direction to the direction of movement of the valve plate, a valve plate movable over a valve seat formed within said body portion, a socket formed in said valve plate, a threaded nut held against rotation in said socket, a screw threaded stem engaging said nut, a locking member to secure said nut with said plate to secure coincident travel of said nut and plate on rotation of the valve stem to vary the passage opening through said body.

13. In a gate valve a body forming when the valve is opened, a passageway substantially at right angles to the direction of movement of the valve plate, a valve plate movable over a valve seat formed within said body portion, a socket formed in said valve plate, a threaded nut held against rotation in said socket, a screw threaded stem engaging said nut, a locking member to secure said nut with said plate to secure coincident travel of said nut and plate on rotation of the valve stem to vary the passage opening through said body.

14. In a gate valve to open or close a fluid passageway, a threaded stem, a nut in engagement therewith and mounted in a valve disk, a valve disk constructed and arranged to receive said nut in engagement locked against rotation, a member locking said nut with said disk against endwise movement except as they move jointly upon the rotation of the stem, a valve seat over which said disk slides when the stem is rotated and means mounted upon the stem limiting the movement in a closing direction.

15. In a gate valve to open or close a fluid passageway, a threaded stem the axis of said stem at substantially right angles to said passageway, a nut in engagement therewith and mounted in a valve disk, a valve disk constructed and arranged to receive said nut in engagement locked against rotation, a member locking said nut with said disk against endwise movement except as they move jointly upon the rotation of the stem, a valve seat over which said disk slides when the stem is rotated and means mounted upon the stem limiting the movement in a closing direction.

GEORGE J. HENRY, Jr.

Witnesses:
PERCY E. CECIL,
ELSIE YOUNG.

Copies of this patent may be obtained for five cents each, by addressing the "Commissioner of Patents, Washington, D. C."